(12) United States Patent
Witas et al.

(10) Patent No.: US 10,430,467 B2
(45) Date of Patent: Oct. 1, 2019

(54) METHOD AND SYSTEM FOR DETERMINING MATCHING SUBJECTS PROVIDED IN A STIMULUS

(71) Applicant: Viant Technology LLC, Irvine, CA (US)

(72) Inventors: Adrian Witas, Los Angeles, CA (US); Kyle R. Kincaid, Los Angeles, CA (US); Varoujan Bedirian, Los Angeles, CA (US)

(73) Assignee: VIANT TECHNOLOGY LLC, Irvine, CA (US)

( * ) Notice: Subject to any disclaimer, the term of this patent is extended or adjusted under 35 U.S.C. 154(b) by 194 days.

(21) Appl. No.: 15/699,933

(22) Filed: Sep. 8, 2017

(65) Prior Publication Data

US 2019/0080021 A1  Mar. 14, 2019

(51) Int. Cl.
*G06F 17/00* (2019.01)
*G06F 16/903* (2019.01)
*G06Q 30/00* (2012.01)

(52) U.S. Cl.
CPC ....... *G06F 16/90335* (2019.01); *G06Q 30/00* (2013.01)

(58) Field of Classification Search
CPC ............ G06F 8/24; G06F 8/315; G06F 8/437; G06F 8/443; G06F 8/70; G06F 8/71
USPC .......................................................... 707/704
See application file for complete search history.

(56) References Cited

U.S. PATENT DOCUMENTS

2010/0205076 A1* 8/2010 Parson .................. G06Q 40/02
705/30

\* cited by examiner

*Primary Examiner* — Truong V Vo
(74) *Attorney, Agent, or Firm* — Gates & Cooper LLP

(57) ABSTRACT

A method and system provide the ability to determine matching subjects for features provided in a stimulus. Subject information is pre-processed by receiving input (a feature type definition and a subject set) and building BitSets across all subjects in the subject set. The stimulus is received and includes stimulus features. For each feature type in the stimulus features, all feature type BitSets from the subject set that match are assembled. An evaluation BitSet is built by combining the assembled feature type BitSets. Matching subjects that match the stimulus are determined based on the evaluation BitSet.

22 Claims, 6 Drawing Sheets

METHOD AND SYSTEM FOR DETERMINING MATCHING SUBJECTS PROVIDED IN A STIMULUS

BACKGROUND OF THE INVENTION

1. Field of the Invention

The present invention relates generally to quickly determining if subjects potentially match features provided in a stimulus/trigger, and in particular, to a method, system, apparatus, and article of manufacture for filtering/determining eligible/matching subjects based on criterion in the subjects and features in a stimulus.

2. Description of the Related Art

In various domains/industries, given an input of a set of subjects that have certain criteria, upon the occurrence of a triggering event/stimulus, it is desirable to determine if features in the stimulus/triggering event match any of the subjects. Depending on the domain/industry, there can be hundreds, to thousands, to hundreds of thousands of different subjects that need to be tested to determine if they match the stimulus. Filtering the number of subjects that may be potential matches to a manageable number in a dynamic, efficient, and fast manner is not only desirable, but essential to provide satisfactory results/services to clients/customers. Prior art systems determine matching subjects using a brute-force method that examines each subject against a provided stimulus with a complexity of O (Subject Count*Feature Count). Such a brute-force method is slow, inefficient, and fails to achieve desired results. Accordingly, what is needed is a system/method for determining matching subjects for features provided in a stimulus in a fast, efficient manner.

SUMMARY OF THE INVENTION

Embodiments of the invention overcome the problems of the prior art by converting input, attributes, subjects, and features to BitSets and performing logical operations on the BitSets to quickly and efficiently determine matching subjects for features provided in a stimulus.

Pre-processing may be performed on a known/received set of information. Such pre-processing may be performed in an offline manner in preparation for the arrival of a stimulus/trigger. In this regard, the criteria for a subject may be static in nature. For example, an advertising campaign may be run for a particular demographic and such a campaign may be built statically and does not change frequently. When the campaign changes (e.g., a feature or criterion of the campaign), the pre-processing may be re-executed. In this manner, a library of pre-processed information may be maintained and available for selection/use.

To perform the pre-processing, various BitSets are built that represent features (i.e., combinations of a feature type and a feature value for the feature type), across all of the subjects. More specifically, inclusion BitSets for each feature type are produced/built wherein each bit in the inclusion BitSet corresponds to a subject, and a value of that bit (e.g., 0 or 1) reflects whether the corresponding subject includes a feature having that feature value. Exclusion BitSets are built in a similar manner and reflect whether a subject specifically excludes a particular feature value. A complementary BitSet is created by logically OR-ing the inclusion BitSets followed by a logical NOT operation. Finally, a feature type-feature value BitSet is built for each feature type by performing a logical XOR operation between the inclusion BitSet and the complementary BitSet for each feature type, followed by logically AND-ing the result with the exclusion BitSet of that feature type-feature value.

Upon arrival of a stimulus/trigger/triggering event, the elements of the stimulus are also converted into a BitSet and evaluated against the pre-processed information using logical operations. In particular, for each feature type in a stimulus, all matching feature type-feature value BitSets (created above) are assembled. To optimize processing, the assembled BitSets may be sorted in ascending order and a logical AND operation is applied across successive assembled BitSets (while skipping any logical AND operation that results in a 0 value for a specific Word) to produce an evaluation BitSet. The evaluation BitSet can be evaluated and for all positions in the BitSet where a bit is set to 1, the corresponding subject is determined to match the stimulus.

Once one (or multiple) matches are found, additional techniques can be used to actually select the particular match to be used as the solution. Accordingly, embodiments of the invention filter/reduce the number of subjects that can be used as a solution based on attributes and values in a stimulus (i.e., that are matched against corresponding attributes and values in a subject set).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
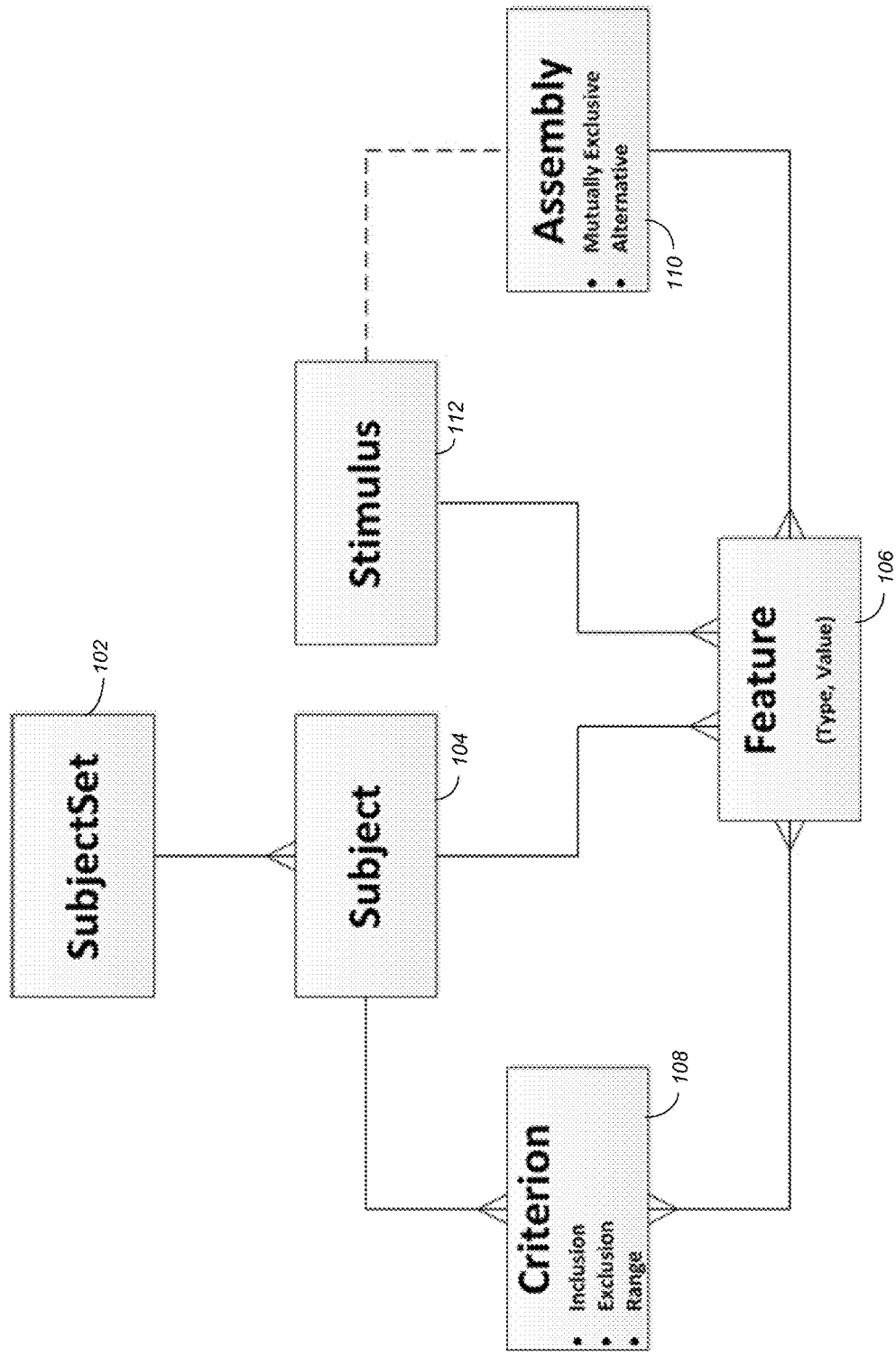
FIG. 1 illustrates a BitSet concept entity-relationship diagram in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention determining matching subjects for features provided in a stimulus by reducing/converting both the criterion in the subjects as well as the features into BitSets, performing various logical operations on the BitSets (both independently and to combine the different BitSets) and determining matches based on an evaluation of the BitSets. Performing an optimized matching based on BitSet operations provides/results in an efficient system and method that filters large data sets/subjects to a manageable number in an effective manner both in terms of processing costs and time.

Terminology

The terms and definitions set forth below provide the context within which embodiments of the operation may operate.

Stimulus: An input array of Features against which to evaluate all Subjects.

Feature Type: One of the two characteristics of a specific Feature, representing a dimension against which to compare.

Feature: An instance of combination of Feature Type and Feature Value.

Assembly: An attribute of a Feature Type:
   Mutually Exclusive: Stimulus can have zero or one Value for this Feature Type. For example, a gender, or city that a user is from is a mutually exclusive attribute (i.e., a user can only be from one city).
   Alternative: Stimulus can have zero or more enumerated Values for this Feature Type. For example, a user behavior/interest or contextual characteristic may be an alternative attribute (e.g., a user may be interested in finance and automobiles, or travel and just completed a retail purchase of shoes).

Subject: An entity specifying Criteria against Features. A Subject may have one or more Inclusion, Exclusion or Range matching Criteria.

SubjectSet: A collection of Subjects as candidates to match against Features of a Stimulus.

Criterion: An attribute of a Subject's Feature Type:
   Inclusion: For a Subject to match a Feature Type in a Stimulus, the Subject must have at least one Value from a provided list for that Feature. EQUAL sign (=) may be used to indicate this Criterion; it uses the OR logical operator between values in the list:
      E.g. Subject (A): Feature (Type=10; Value=100, 300)
   Exclusion: For a Subject to match a Feature Type in a Stimulus, the Subject cannot have any Value from a provided list for that Feature. NOT EQUAL (!=) may be used to indicate this Criterion; it uses the NOT AND logical operator between values in the list:
      E.g. Subject (A): Feature (Type=20; Value!=100, 700)
   Range: For a Subject to match a Feature Type in a Stimulus, the Value needs to be in the range of values provided for the Subject. For example, one may target an age range of 18-30. This Criterion may use the GREATER THAN OR EQUAL (>=) or LESS THAN OR EQUAL (<=) signs and operators for provided values:
      E.g. Subject (C): Feature (Type=30; Value>=100)
      E.g. Subject (E): Feature (Type=40; Value <=900)

Word: 64 bits.

BitSet: A set of 1s and 0s, where each Subject in the SubjectSet being evaluated corresponds to or is represented by a bit. In one or more embodiments, such a representation may result in the BitSet being equal in length to the number of Subjects in SubjectSet being evaluated. A BitSet is represented by as many Words as needed to account for all Subjects.
   E.g. with 200 Subjects, each BitSet may be 200 bits, while technically implemented using 4 Words=ROUNDUP (200/64).
   BitSet (0): A BitSet created with all bits cleared to 0.
   E.g. For 5 Subjects BitSet (0)=[0, 0, 0, 0, 0].
   BitSet (1): A BitSet created with all bits set to 1.

FIG. 1 illustrates a BitSet concept entity-relationship diagram in accordance with one or more embodiments of the invention. As illustrated and described above, the SubjectSet 102 contains multiple Subjects 104. Each subject has multiple Features 106 that consist of feature type-feature value combinations. Each feature type of a subject 104 has an at least two attributes: Criterion 108 (e.g., inclusion, exclusion, or range); and Assembly 110 (i.e., the assembly process) (e.g., mutually exclusive or alternative). The Stimulus 112 is an array of Features 106 against which to evaluate the Subjects 104. Further, the Stimulus 112 has a set of values depending on the attribute in the Assembly 110.

Methodology

One or more embodiments of the invention create as many BitSets as there are Values in Criteria 108 across a SubjectSet 102, plus a Complementary BitSet for each Feature Type. In one or more embodiments, each BitSet will have the same length, equal to the count of Subjects 104 being evaluated. In the same or alternative embodiments, each of the Subjects 104 is represented by or corresponds to a bit in the BitSets (i.e., there may be more bits than count of Subjects 104 but each subject corresponds to and/or is represented by a bit in the BitSet, while some bits may be excess/padding/filler). Thus, the count of subjects may not necessarily be divisible by 64, and thus some Word could have less than 64 Subjects represented. Further, in a specific BitSet, a bit with a value 1 at position (P) indicates that Subject (P) meets the Criteria 108 to be matched against Feature(s) 106 of the Stimulus 112.

The following equations reflect the BitSets and Complementary BitSets that may be crated in accordance with one or more embodiments of the invention:

$$\text{Feature (Type=T; Value=V) BitSet}=[\text{MatchingBitforSubject}^A, \text{MatchingBitforSubject}^B, \ldots, \text{MatchingBitforSubject}^z]$$

$$\text{Feature (Type=T) Complementary BitSet}=[\text{MatchingBitforSubject}^A, \text{MatchingBitforSubject}^B, \ldots, \text{MatchingBitforSubject}^z]$$

where:
   T and V: The number of unique combinations of Feature Types and Feature Values involved in evaluating across the SubjectSet 102.
   Z: The number of Subjects 104 to evaulate.

There are two primary phases/steps that may be used to perform the matching/filtering of potential matches:
   (1) Pre-processing—where all elements to be evaluated (e.g., SubjectSet 102, Subjects 104, Criterion 108, Features 106, and Assembly 110) are known/have been received and are pre-processed (e.g., offline); and
   (2) Stimulus/Trigger Processing—wherein the Stimulus 112 arrives/is available and is used to evaluate Subjects against.

Figure 2:
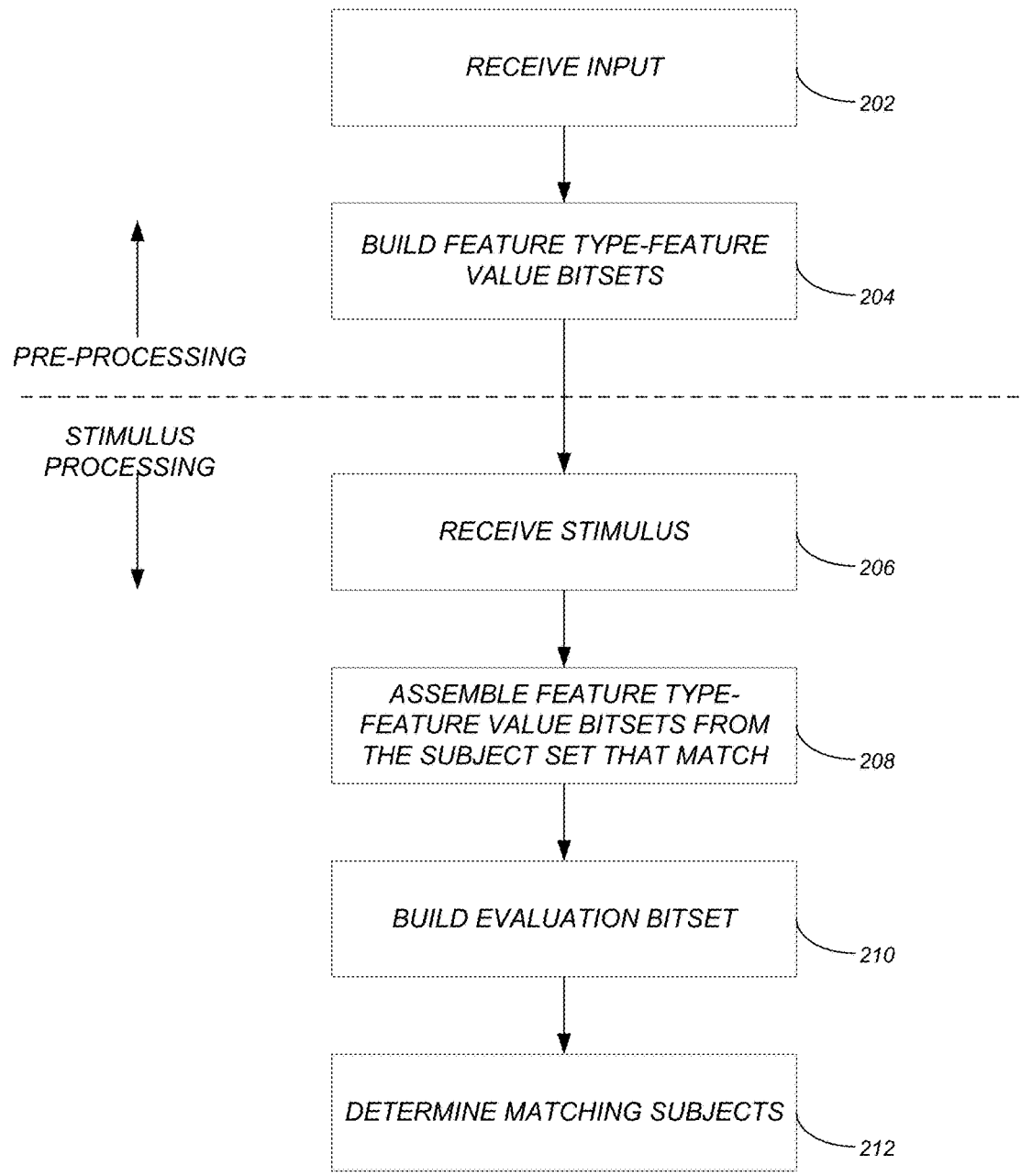
FIG. 2 illustrates the logical flow for determining matching subjects for features provided in a stimulus in accordance with one or more embodiments of the invention.

FIG. 2 illustrates the logical flow for determining matching subjects for features provided in a stimulus in accordance with one or more embodiments of the invention.

Steps 202-204 provide for pre-processing of the subject information. At step 202, input is received. In this regard, when a Subject's Feature 106 or Criterion 108 changes (addition, edit or deletion), a series of operations are executed for that Feature Type. Thus, the input received at step 202 may include a feature type definition (that includes one or more feature types, and a criterion and an assembly process to be used for each of the feature types. Further the input includes a subject set consisting of one or more subjects, and one or more features for each subject. Each feature is a combination of one of the feature types and one or more feature values.

At step 204, for each combination of feature type-feature value, a feature type-feature value BitSet is built across all of the subjects. As described above, each of the subjects is represented by a bit in each feature type-feature value BitSet. There may be multiple steps involved in building the feature type-feature value BitSets including building inclusion BitSets, exclusion BitSets, and complementary BitSets (followed by a logical operation that create a usable/resulting feature type-feature value BitSet.

Figure 3:
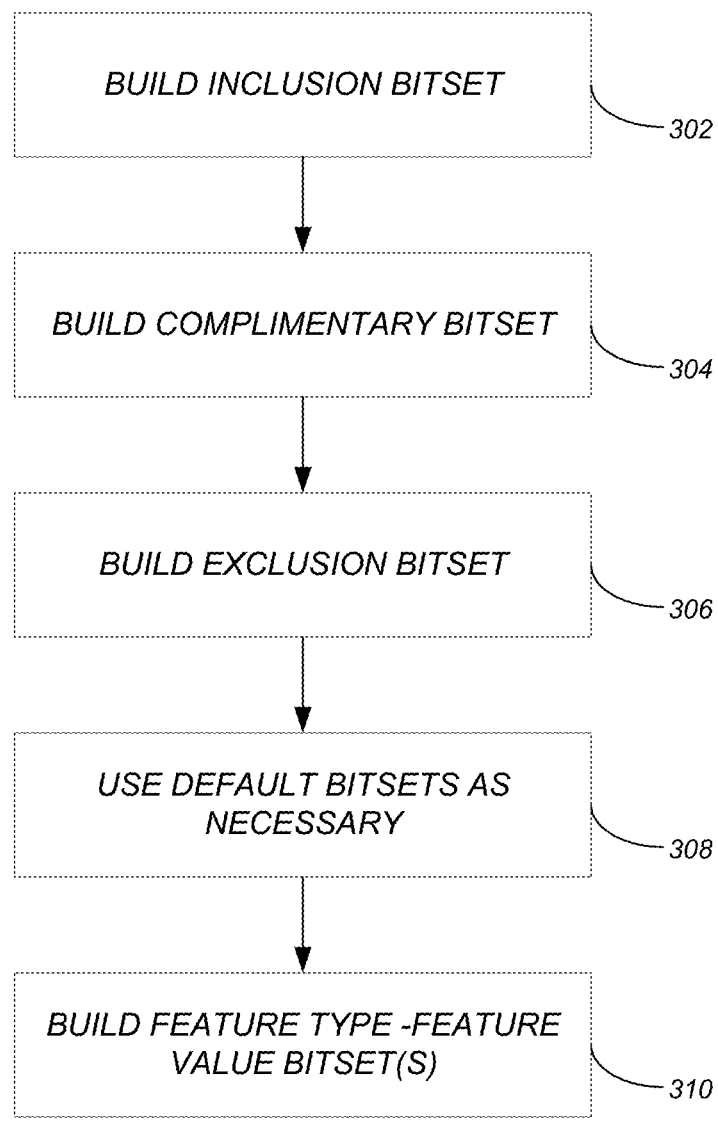
FIG. 3 illustrates the detailed logical flow for building the feature type-feature value BitSets of step 204 in accordance with one or more embodiments of the invention.

FIG. 3 illustrates the detailed logical flow for building the feature type-feature value BitSets of step 204 in accordance with one or more embodiments of the invention.

At step 302, a feature type-feature value inclusion BitSet is built. For each feature type in the combination that has the criterion of an inclusion or a range, a first BitSet value (e.g., zero (0) BitSet default value) is set for every subject, and the bit at a position that corresponds to the subject that provides the feature value in the combination is set to a second BitSet value that is an inverse of the first BitSet value (e.g., one (1)). In other words:

Build Feature Type-Feature Value Inclusion BitSets: For each Feature's Value listed as an Inclusion or Range Criterion, start with BitSet (0) and set bit at position (P) to 1.

At step 304, for each feature type, a complementary BitSet is built. Each complementary BitSet has a bit that corresponds to one of the subjects (e.g., the number of bits may match the subject count). To build the complementary BitSet, first, a logical OR operation of all of the feature type-feature value inclusion BitSets (that have the same feature type) may be performed. Thereafter, a logical NOT operation is performed on the results of the logical OR operation. In other words:

Complementary BitSet=NOT (OR (Inclusion BitSets))

Complementary BitSets are built for the cases where a provided Value within a Feature of the Stimulus is not explicitly listed in any Subject Criterion. In this case, Complementary BitSet is used as an implicit Inclusion rule. Accordingly, all Subjects with Inclusion Criterion will be flagged as 0 and thus not match.

At step 306, a feature type-feature value exclusion BitSet is built. For each feature type in the combination that has the criterion of an exclusion, each bit is assigned a value of the second BitSet Value (e.g., one (1)) for every subject, and the bit at a position that corresponds to the subject that provides the feature value in the combination is set to the first BitSet value (e.g., a value of zero (0)). In other words:

For each Feature's Value listed as an Exclusion Criterion, start with the second BitSet value (e.g., 1) and set bit at position (P) to the first BitSet value (e.g., 0).

At this point, each Feature Value will have three possibilities:
a. Inclusion and Exclusion BitSets exist.
b. Only Inclusion BitSet exists.
c. Only Exclusion BitSet exists.

At step 308, default BitSets may be used as necessary. For example, for each Feature Value for which an Inclusion or Exclusion BitSet does not exist, BitSet(0) and BitSet(1) may be used respectively in computing the Feature BitSet.

At step 310, the feature type-feature value BitSet is built. To build the BitSet, a logical XOR operation may be performed between the feature type-feature value inclusion BitSet and the complementary BitSet. Thereafter, a logical AND operation is performed between a result of the logical XOR operation and the feature type-feature value exclusion BitSet. In other words:

Build Feature Type-Feature Value BitSet =
(Feature Type-Feature Value Inclusion BitSet XOR Feature Type Complementary BitSet)
AND
(Feature Type-Feature Value Exclusion BitSet)

Returning to FIG. 2, at step 206, the stimulus is received/is available. In this regard, once the stimulus is available to evaluate subjects against, steps 208-212 are performed. The stimulus includes stimulus features, and each stimulus feature is a feature type- feature value combination. If the needed feature type-feature value BitSet does not exist, the feature type complementary BitSet may be used.

At step 208, for each feature type in the stimulus features, all feature type BitSets from the subject set that match are assembled (resulting in assembled feature type BitSets).

To assemble the assembled feature type BitSets, there are generally three different cases:
a) Criterion (for the feature type) is not a Range, and the Assembly process is Mutually exclusive:
  i. Use Feature Type-Feature Value BitSet (i.e., as the assembled feature type BitSet).
b) Criterion (for the feature type) is not a Range, and the Assembly is Alternative:
  i. Build and Use a BitSet union that combines the feature type-feature value BitSets for feature values having a common feature type (i.e., as the assembled feature type BitSet); in other words, use Feature BitSets for provided values to build a BitSet union.
c) Feature is of Range CriterionType:
  i. building a BitSet union that combines the feature type-feature value BitSets for feature values within the range and having a common feature type (i.e., take all Feature BitSets for provided range to build a BitSet union).
  ii. If Range is greater than or equal to (>=), then use a BitSet union of all BitSets with feature type-feature values lower than the stimulus feature type-stimulus feature value combination (i.e., using the feature type-feature value BitSet corresponding to a highest feature value that is lower than the stimulus feature value).
  iii. If Range <=, then use a BitSet union of all BitSets with feature type-feature values at or higher than the stimulus feature type-stimulus feature value combination (i.e., using the feature type-feature value BitSet corresponding to the lowest feature value that is greater than or equal to the stimulus feature value).
  iv. Logical operator OR these BitSets with the Feature Type Complementary BitSet (i.e., performing a logical OR operation between a result from the above and the complementary BitSet, resulting in the assembled feature type BitSet).

For each Feature Type that is not in Stimulus, the Feature Type's Complementary BitSet is used as the assembled feature type BitSet.

At this point, each Feature Type will be represented by its BitSet.

At step 210, the evaluation BitSet is built by combining the assembled feature type BitSets. The evaluation BitSet is built by performing a logical AND operation to the assembled feature type BitSets.

At step 212, the matching subjects that match the stimulus are determined (based on the evaluation BitSet). To determining the matching, from the evaluation BitSet, all positions where a bit is set to the second BitSet value (e.g., a logical one (1)) correspond to the subjects that match the stimulus. E.g. if position 3 has a 1 bit, then Subject C matches.

To reduce the complexity of the evaluation of Subjects, in step 208, the Assembled Feature Type BitSets may be sorted by bit count with the second BitSet value (e.g., value 1) in an ascending order. The logical AND operation is performed to successive groups of bits within the assembled feature type BitSets in the ascending order. When a resultant value of the groups of bits in the evaluation BitSet resulting from the logical AND operation is the first BitSet value (e.g., zero (0)), performance of the logical AND operation on remaining groups of bits in the sorted assembled feature type BitSets (at a same position as the group of bits) may be skipped, and one may determine that the subject corresponding to the valuation bit is not a match. In one or more embodiments, the logical AND operation may be performed across successive (64 bit) Words. Thus, if the value of a resulting Word is 0, evaluation of remaining Words with higher bit counts for the same Subjects may be skipped, all Subjects (max 64) may be tagged as not matching, and the process moves to the next set of Words.

Table 1 below illustrates a code snippet for performing the sorting and building the evaluation BitSet.

TABLE 1

```
sort.Sort(&sorter{BitSets:featureSet})
subjectIn64BitSegments := make([]uint64, size)
// Copy (the lowest bit count) feature into resulting BitSet
For i :=0; i < len(subjectIn64BitSegments); i++ {
    subjectIn64BitSegments[i] = faetureSet[0].Words[i]
}
//repeat for each segment of 64bit subjects
For i:= 0; i < len(subjectIn64BitSegments); i++ {
    //repeat for each featureset
    for j := 1; j < len(featuresSet); j++ {
        subejctIn64BitSegments[i] &= featureSet[j].Words[i]
        // if result is zero, then skip evaluation of
        // remaining features, and go to the next subject
64      // bit segments
        If (subjectIn64BitSegments[i] == ZeroBitsSet) {
            Break;
        }
    }
}
Result := &BitSet{Words:subjectIn64BitSegments}
```

EXAMPLE

Based on the above methodology, an exemplary application may be useful to more fully understand the invention.

At step 202, the input is received. An exemplary input is in Table 2 below that includes the feature type, criterion 108, and assembly 110. The input in Table 2 defines the criterion 108 and assembly process 110 to be used for the identified feature type.

Feature Type, Criterion, and Assembly

TABLE 2

| Feature Type | Criterion | Assembly |
|---|---|---|
| 10 | Inclusion/Exclusion | Mutually Exclusive |
| 20 | Inclusion/Exclusion | Alternative |
| 30 | Range | Mutually Exclusive |
| 40 | Inclusion/Exclusion | Mutually Exclusive |

Subject Set

Figure 4:
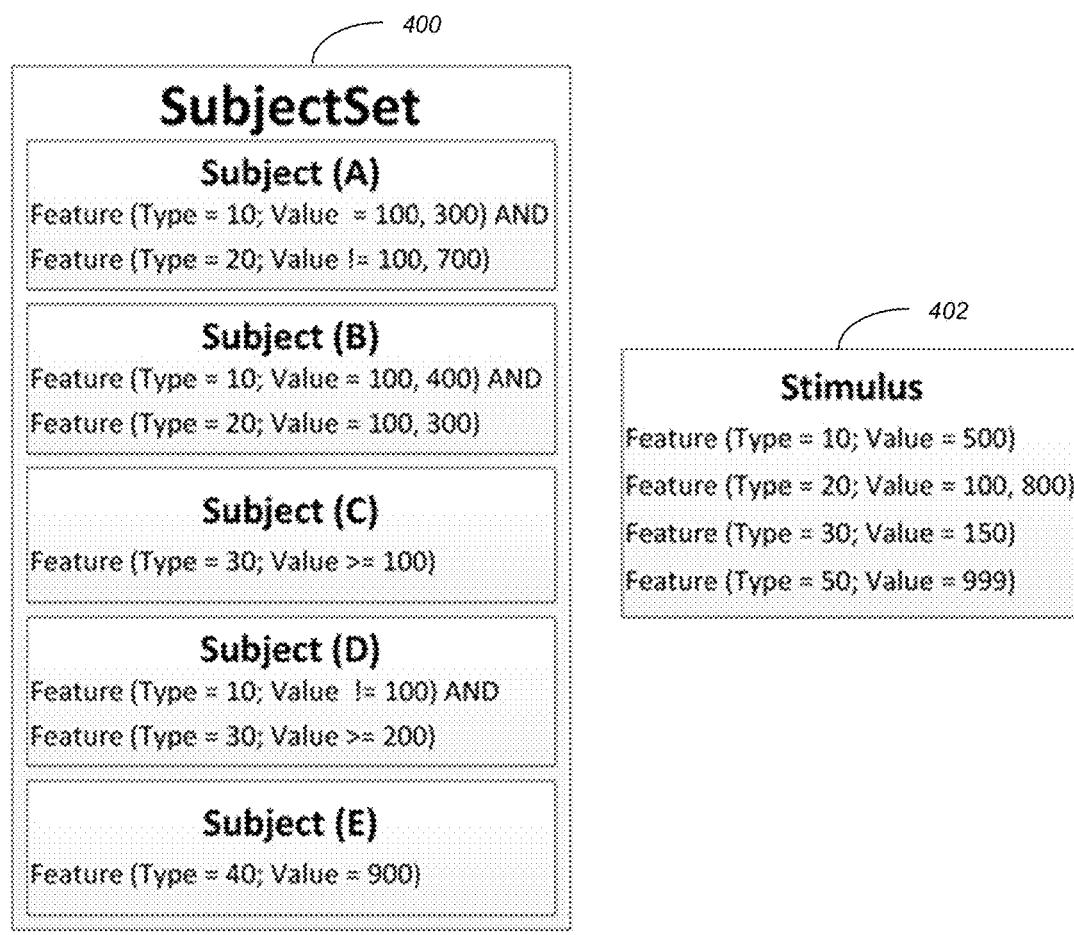
FIG. 4 illustrates exemplary input that may be received in accordance with one or more embodiments of the invention.

Additional input includes a subject set 102 (i.e., the list of subjects 104 and features 106 for each subject). FIG. 4 illustrates exemplary input that may be received in accordance with one or more embodiments of the invention. The following reflects subject set 400:

A. Subject (A): Feature (Type=10; Value=100, 300) AND Feature (Type=20; Value!=100, 700)
    B. Subject (B): Feature (Type=10; Value=100, 400) AND Feature (Type=20; Value=100, 300)
    C. Subject (C): Feature (Type=30; Value>=100)
    D. Subject (D): Feature (Type=10; Value!=100) AND Feature (Type=30; Value>=200)
    E. Subject (E): Feature (Type=40; Value=900)

Referring to FIG. 2, at step 204, the feature type-feature value BitSets are created based on the received input. The input includes five (5) subjects (A, B, C, D, and E). Accordingly, an exemplary feature type BitSet will be [A, B, C, D, E].

Given the 5 subjects, there are four feature types (10, 20, 30, and 40). The process will evaluate each feature type-feature value combination across all of the subjects and create relevant BitSets. Below is a summary of the different BitSets created.

1. Feature (Type=10):
    a. Inclusion BitSets:
        Feature (Type=10; Value=100): [1, 1, 0, 0, 0]
        Feature (Type=10; Value=300): [1, 0, 0, 0, 0]
        Feature (Type=10; Value=400): [0, 1, 0, 0, 0]
    b. Exclusion BitSet:
        Feature (Type=10; Value=100): [1, 1, 1, 0, 1]
    c. Feature (Type=10) Complementary BitSet: [0, 0, 1, 1, 1]
    d. Feature Type-Feature Value BitSets:
        Feature (Type=10; Value=100): [1, 1, 1, 0, 1]
        Feature (Type=10; Value=300): [1, 0, 1, 1, 1]
        Feature (Type=10; Value=400): [0, 1, 1, 1, 1]
2. Feature (Type=20):
    a. Inclusion BitSets:
        Feature (Type=20; Value=100): [0, 1, 0, 0, 0]
        Feature (Type=20; Value=300): [0, 1, 0, 0, 0]
    b. Exclusion BitSets:
        Feature (Type=20; Value=100): [0, 1, 1, 1, 1]
        Feature (Type=20; Value=700): [0, 1, 1, 1, 1]
    c. Feature (Type=20) Complementary BitSet: [1, 0, 1, 1, 1]
    d. Feature Type-Feature Value BitSets:
        Feature (Type=20; Value=100): [0, 1, 1, 1, 1]
        Feature (Type=20; Value=300): [1, 1, 1, 1, 1]
        Feature (Type=20; Value=700): [0, 0, 1, 1, 1]
3. Feature (Type=30):
    a. Inclusion BitSets:
        Feature (Type=30; Value=100): [0, 0, 1, 0, 0]
        Feature (Type=30; Value=200): [0, 0, 0, 1, 0]
    b. Feature (Type=30) Complementary BitSet: [1, 1, 0, 0, 1]
    c. Feature Type-Feature Value BitSets:
        Feature (Type=30; Value=100): [1, 1, 1, 0, 1]
        Feature (Type=30; Value=200): [1, 1, 0, 1, 1]
4. Feature (Type=40):
    a. Inclusion BitSet:
        Feature (Type=40; Value=900): [0, 0, 0, 0, 1]
    b. Feature (Type=40) Complementary BitSet: [1, 1, 1, 1, 0]
    c. Feature Type-Feature Value BitSet:
        Feature (Type=40; Value=900): [1, 1, 1, 1, 1]

Feature type 10's criterion is inclusion/exclusion and the subject set is consistent with three (3) inclusion values (100, 300, and 400), and one (1) exclusion value (100). Referring to FIG. 3, step 302 is to build an inclusion BitSet. For each feature's value listed as inclusion, you start with BitSet (0), and set the bit at position (P) to 1. Thus, for feature type 10, value 100, subjects A and B contain such features. Accordingly, the inclusion BitSet is [1,1,0,0,0](corresponding to [A, B, C, D, E]. Similarly, for feature type 10, value 300, only subject A has the feature, resulting in [1,0,0,0,0]. Lastly, for feature type 10, value 400, only value B has the feature, resulting in [0,1,0,0,0].

To build the complementary BitSet, all of the inclusion BitSets are logically OR-ed and a logical NOT operation is applied. The OR operation:
[1,1,0,0,0] OR
[1,0,0,0,0] OR
[0,1,0,0,0]
=[1,1,0,0,0].

The logical NOT is applied resulting in [0,0,1,1,1].

To create the exclusion BitSet at step 306, the process starts with BitSet (1), and sets the bit at position (P) to 0. For type 10, value 100, only subject D has the feature resulting in [1,1,1,0,1].

At step 310, the feature type-feature value BitSets are created by performing a logical XOR operation between the inclusion BitSet and the complementary BitSet, and logically ANDing the result with the feature type-feature value exclusion BitSet. For example, the logical XOR operation for feature type 10, value 100 is:
inclusion BitSet [1,1,0,0,0] XOR
complementary BitSet [0,0,1,1,1]
=[1,1,1,1,1].

The logical AND operation is:
[1,1,1,1,1] AND
[1,1,1,0,1]
=[1,1,1,0,1].

The same process is applied to the other feature type-feature value combinations to create the feature type-feature value BitSets identified in the summary above. In other words, this process is followed for each feature value listed as an inclusion, exclusion, or range criterion (i.e., all of the feature types). If a feature value for which an inclusion or exclusion does not exist, the BitSet (0) and BitSet(1) respectively are used in computing the feature BitSet.

Stimulus

Once the stimulus 402 arrives at step 206, the process continues with the evaluation of the subjects against the stimulus 402. Continuing with the example depicted in FIG. 4, the stimulus/trigger that is received may be:
1. Feature (Type=10; Value=500)
2. Feature (Type=20; Value=100, 800)
3. Feature (Type=30; Value=150)
4. Feature (Type=50; Value=999)

As described above, for each feature type found in Stimulus matching feature type-feature value BitSets are assembled at step 208. If a feature type is not in the stimulus, the feature type's complementary BitSet is used instead. Accordingly,
1. As Feature (Type=10; Value=500) Inclusion BitSet does not exist, use Feature (Type=10) Complementary BitSet:
   [0, 0, 1, 1, 1]
2. Feature (Type=20; Value 100) Inclusion BitSet exists. But Feature (Type=20; Value 800) Inclusion BitSet does not exist. For this latter, use Feature (Type=20) Complementary BitSet. Result=[0, 1, 1, 1, 1] OR [1, 0, 1, 1, 1]:
   [1, 1, 1, 1, 1]
3. Feature (Type=30; Value=150) does not have a BitSet. But Feature being of Criterion Range with>=, we'll use Feature (Type=30; Value=k) where k is highest value still less than or equal to 150. In this case, no other BitSets exist with k<100, so the Union operation is the same as BitSet (Type=30; Value=100). Thus, we use BitSet for Feature (Type=30; Value=100), and OR this with Feature (Type=30) Complementary BitSet. Result=[1, 1, 1, 0, 1] OR [1, 1, 0, 0, 1]
   [1, 1, 1, 0, 1]
4. Feature (Type=50) is not used by any Subject. Thus, ignore, and do not even generate a BitSet for it.

For each feature type not found in the Stimulus, yet available in the SubjectSet:
5. Feature (Type=40) is not found in SubjectSet, thus use its Complementary BitSet:
   [1, 1, 1, 1, 0]

To optimize the processing, the different BitSets may be sorted in ascending order. In this regard, the assembled BitSets are sorted by lowest to highest count of bits set to 1:
Feature (Type=10): [0, 0, 1, 1, 1], results in count of 3
Feature (Type=30): [1, 1, 1, 0, 1], count of 4
Feature (Type=40): [1, 1, 1, 1, 0], count of 4
Feature (Type=20): [1, 1, 1, 1, 1], count of 5

At step 210, the evaluation BitSet is built/created. In this regard, a single BitSet is generated by AND-ing the Feature BitSets. Result:
[0, 0, 1, 0, 0]

When performing the successive AND operations across the same position Words of sorted BitSets, once a "0" value results, the AND operation does not need to be performed on remaining BitSets of that Word position. E.g., given these three Words
[0,0,0,0,0,0,0,1,0,0,0,0,1,1,0,0,1,1,0,0,1,0,0,0,0,0,0,1,0,0,0, 0,0,1,0,0,0,0,0,0,1,1,0,0,0,1,0,1,0,0,0,0,0,1,1,0,0,1,0,1,0,0, 0,1,0]: Count 17
[0,1,0,1,1,1,0,0,0,0,0,1,1,0,0,1,1,0,0,1,1,0,1,1,1,0,1,0,0,1,1,1, 1,0,0,1,1,1,0,1,0,0,0,1,0,1,0,1,0,1,0,1,0,0,0,0,1,1,0,1,0,0,1, 1,0,0]: Count 32
[1,0,1,1,1,0,1,1,0,1,1,1,1,1,0,0,1,1,0,1,1,0,0,1,1,1,0,1,0,1,1, 0,1,1,0,1,1,1,1,0,1,1,0,1,1,1,0,1,0,1,1,0,1,1,0,1,1,0,1,1,1,1, 0,1,1]: Count 44

AND-ing the first two Words of BitSets already results in a Word with all 0s. Thus, no successive AND operation need be performed with the $3^{rd}$ Word.

With the output, only position P=3 has 1 as a bit, meaning only Subject (C) in the SubjectSet matches the provided Stimulus. In this manner, a large number of ineligible subjects may be quickly filtered out for matching.

Industry Specific Examples

Embodiments of the invention may be utilized in various different domains/industries. Table 3 below illustrates various exemplary domains/industries, how the different inputs/elements map to such an industry, and an exemplary/primary/main use case.

TABLE 3

| Industry | Equivalence/Mapping | Main Use Case |
| --- | --- | --- |
| Digital Advertising | Subject: A Campaign with specific targeting. Stimulus: A request for a bid or publisher impression. Feature Type: Dimensions such as Time of Day, End User's current GPS coordinates, Operating System of End User's device (all are Inclusion/Exclusion Criterion, and Mutually Exclusive Assembly); End User Age (Criterion is Range, and Assembly is Mutually | Filtering thousands of Campaigns down before deciding on auction winner. |

TABLE 3-continued

| Industry | Equivalence/Mapping | Main Use Case |
|---|---|---|
| Parcel Storage | Exclusive); End User Behaviors, Site Context (all are Inclusion/Exclusion Criterion, and Alternative Assembly). Subject: A Storage Bin with specific allowance. Stimulus: A request to store a Parcel. Feature Type: Parcel dimension, weight, max duration of storage, content type (i.e. glass). | Filtering Storage Bins down before deciding on the final one. |
| Autonomous Vehicle Storage | Subject: A Parking Slot of specific size. Stimulus: A request to store an Autonomous Vehicle. Feature Type: Vehicle dimensions, weight, ease of getting in and out of tight spots. | Filtering available Parking Spots down before deciding on the final one. |

Hardware Embodiments

Figure 5:
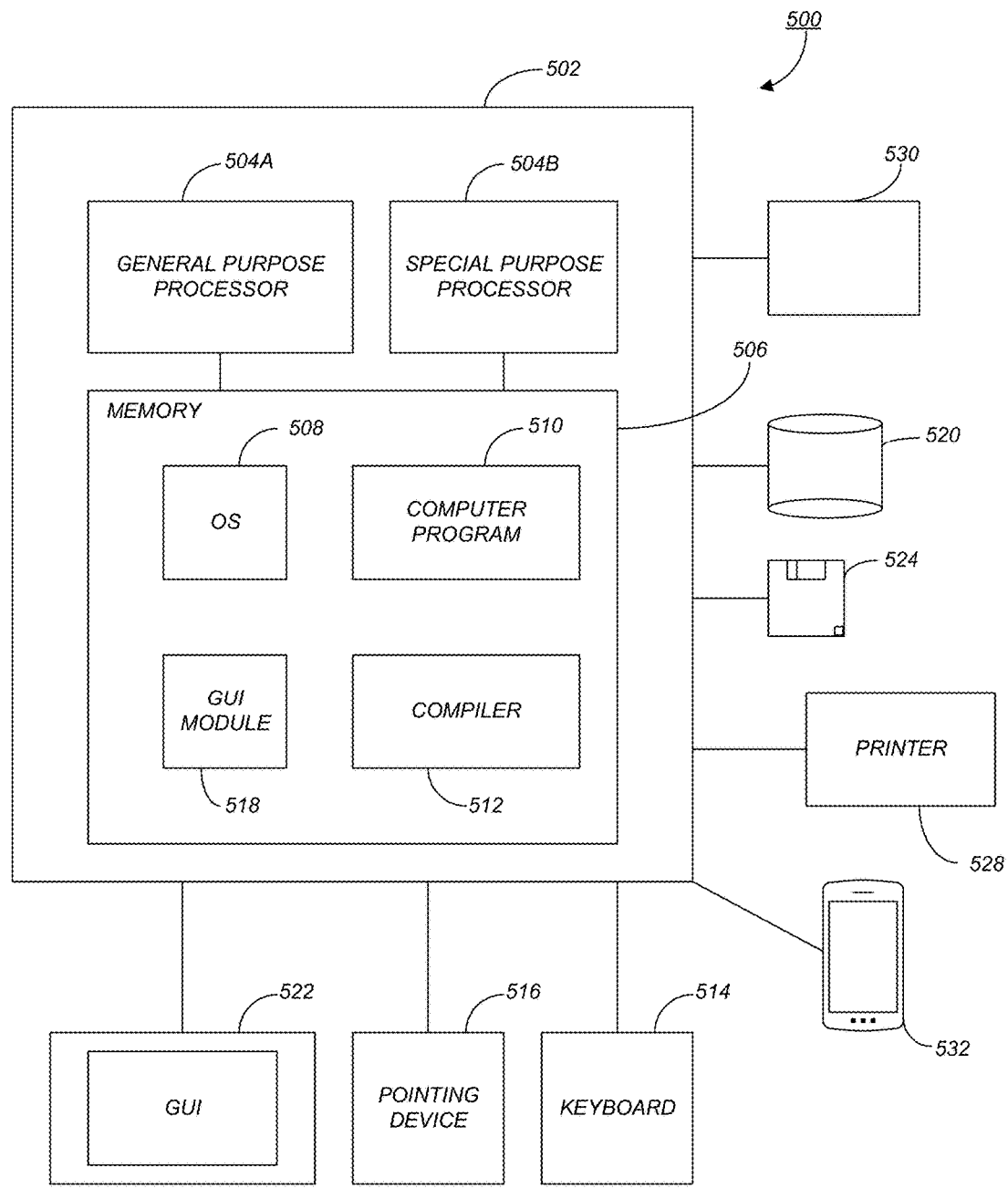
FIG. 5 is an exemplary hardware and software environment used to implement one or more embodiments of the invention.

FIG. 5 is an exemplary hardware and software environment 500 used to implement one or more embodiments of the invention. The hardware and software environment includes a computer 502 and may include peripherals. Computer 502 may be a user/client computer, server computer, or may be a database computer. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to, and/or integrated with, other devices, including input/output (I/O) devices such as a keyboard 514, a cursor control device 516 (e.g., a mouse, a pointing device, pen and tablet, touch screen, multi-touch device, etc.) and a printer 528. In one or more embodiments, computer 502 may be coupled to, or may comprise, a portable or media viewing/listening device 532 (e.g., an MP3 player, IPOD, NOOK, portable digital video player, cellular device, personal digital assistant, etc.). In yet another embodiment, the computer 502 may comprise a multi-touch device, mobile phone, gaming system, internet enabled television, television set top box, or other internet enabled device executing on various platforms and operating systems.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508, to provide output and results.

Output/results may be presented on the display 522 or provided to another device for presentation or further processing or action. In one embodiment, the display 522 comprises a liquid crystal display (LCD) having a plurality of separately addressable liquid crystals. Alternatively, the display 522 may comprise a light emitting diode (LED) display having clusters of red, green and blue diodes driven together to form full-color pixels. Each liquid crystal or pixel of the display 522 changes to an opaque or translucent state to form a part of the image on the display in response to the data or information generated by the processor 504 from the application of the instructions of the computer program 510 and/or operating system 508 to the input and commands. The image may be provided through a graphical user interface (GUI) module 518. Although the GUI module 518 is depicted as a separate module, the instructions performing the GUI functions can be resident or distributed in the operating system 508, the computer program 510, or implemented with special purpose memory and processors.

In one or more embodiments, the display 522 is integrated with/into the computer 502 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 502 according to the computer program 510 instructions may be implemented in a special purpose processor 504B. In this embodiment, the some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program 510 instructions. In one embodiment, the special purpose processor 504B is an application specific integrated circuit (ASIC).

The computer 502 may also implement a compiler 512 that allows an application or computer program 510 written in a programming language such as C, C++, Assembly, SQL, PYTHON, PROLOG, MATLAB, RUBY, RAILS, HASKELL, or other language to be translated into processor 504 readable code. Alternatively, the compiler 512 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 510 accesses and manipulates data accepted from I/O devices and stored in the memory 506 of the computer 502 using the relationships and logic that were generated using the compiler 512.

The computer 502 also optionally comprises an external communication device such as a modem, satellite link, Ethernet card, or other device for accepting input from, and providing output to, other computers 502.

In one embodiment, instructions implementing the operating system 508, the computer program 510, and the compiler 512 are tangibly embodied in a non-transitory computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of computer program 510 instructions which, when accessed, read and executed by the computer 502, cause the computer 502 to perform the steps necessary to implement and/or use the present invention or to load the program of instructions into a memory 506, thus creating a special purpose data structure causing the computer 502 to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 502.

Figure 6:
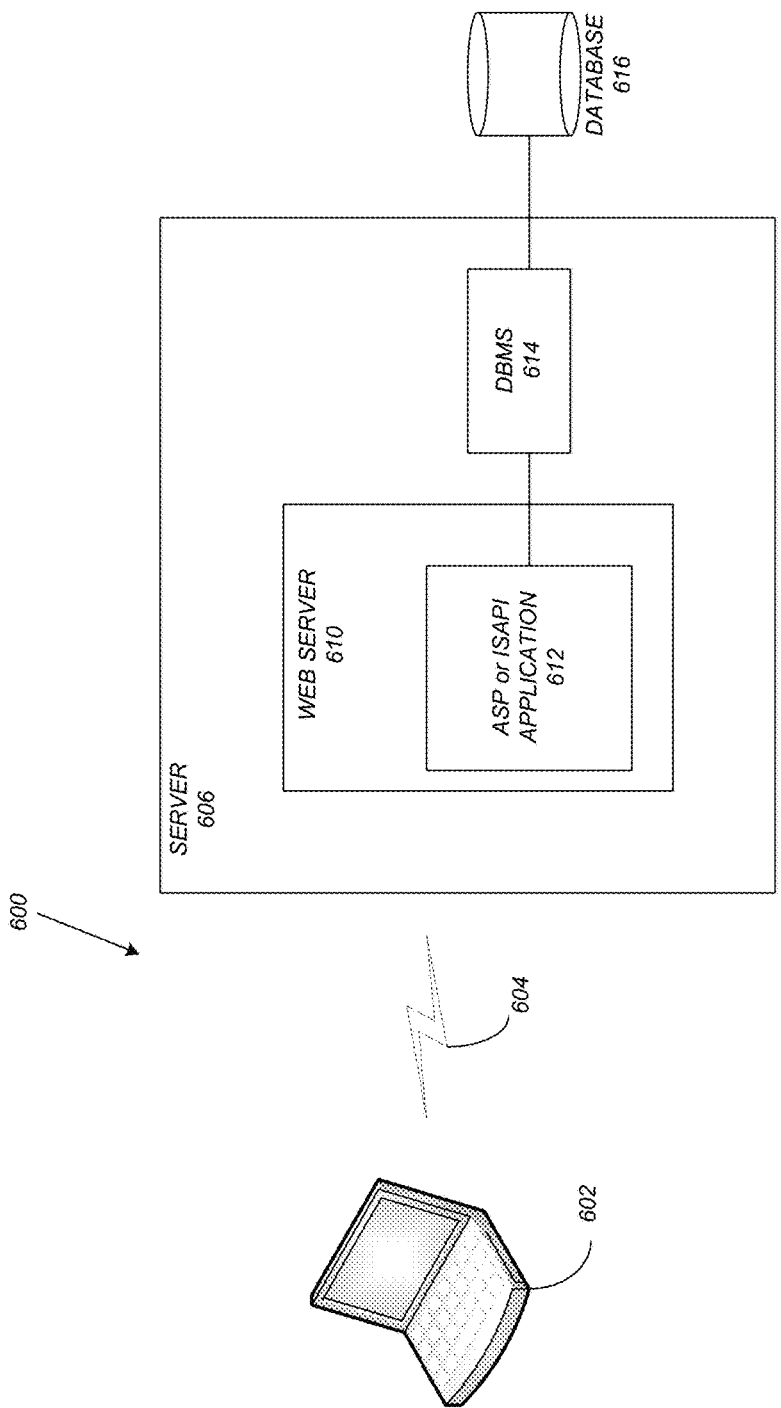
FIG. 6 schematically illustrates a typical distributed/cloud-based computer system using a network to connect client computers to server computers in accordance with one or more embodiments of the invention.

FIG. 6 schematically illustrates a typical distributed/cloud-based computer system 600 using a network 604 to connect client computers 602 to server computers 606. A typical combination of resources may include a network 604 comprising the Internet, LANs (local area networks), WANs (wide area networks), SNA (systems network architecture) networks, or the like, clients 602 that are personal computers or workstations (as set forth in FIG. 5), and servers 606 that are personal computers, workstations, minicomputers, or mainframes (as set forth in FIG. 5). However, it may be noted that different networks such as a cellular network (e.g., GSM [global system for mobile communications] or otherwise), a satellite based network, or any other type of network may be used to connect clients 602 and servers 606 in accordance with embodiments of the invention.

A network 604 such as the Internet connects clients 602 to server computers 606. Network 604 may utilize ethernet, coaxial cable, wireless communications, radio frequency (RF), etc. to connect and provide the communication between clients 602 and servers 606. Further, in a cloud-based computing system, resources (e.g., storage, processors, applications, memory, infrastructure, etc.) in clients 602 and server computers 606 may be shared by clients 602, server computers 606, and users across one or more networks. Resources may be shared by multiple users and can be dynamically reallocated per demand. In this regard, cloud computing may be referred to as a model for enabling access to a shared pool of configurable computing resources.

Clients 602 may execute a client application or web browser and communicate with server computers 606 executing web servers 610. Such a web browser is typically a program such as MICROSOFT INTERNET EXPLORER, MOZILLA FIREFOX, OPERA, APPLE SAFARI, GOOGLE CHROME, etc. Further, the software executing on clients 602 may be downloaded from server computer 606 to client computers 602 and installed as a plug-in or ACTIVEX control of a web browser. Accordingly, clients 602 may utilize ACTIVEX components/component object model (COM) or distributed COM (DCOM) components to provide a user interface on a display of client 602. The web server 610 is typically a program such as MICROSOFT'S INTERNET INFORMATION SERVER.

In one or more embodiments of the invention, server computer 606 may be advertising servers that perform all of the steps described above. In this regard, an advertising impression auction may be conducted by an advertising server and such an advertising server may filter advertising campaigns before determining the winner of the auction for an impression/set of impressions. Similarly, the various steps may be performed on a local client application that is performing the matching (e.g., to determine the appropriate storage location for a parcel, to filter available parking spots, etc.).

Web server 610 may host an Active Server Page (ASP) or Internet Server Application Programming Interface (ISAPI) application 612, which may be executing scripts. The scripts invoke objects that execute business logic (referred to as business objects). The business objects then manipulate data in database 616 through a database management system (DBMS) 614. Alternatively, database 616 may be part of, or connected directly to, client 602 instead of communicating/obtaining the information from database 616 across network 604. When a developer encapsulates the business functionality into objects, the system may be referred to as a component object model (COM) system. Accordingly, the scripts executing on web server 610 (and/or application 612) invoke COM objects that implement the business logic. Further, server 606 may utilize MICROSOFT'S TRANSACTION SERVER (MTS) to access required data stored in database 616 via an interface such as ADO (Active Data Objects), OLE DB (Object Linking and Embedding DataBase), or ODBC (Open DataBase Connectivity).

Generally, these components 600-616 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 602 and 606 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 602 and 606. Embodiments of the invention are implemented as a software application on a client 602 or server computer 606. Further, as described above, the client 602 or server computer 606 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

Embodiments of the invention reduce the complexity of finding matching subjects for features provided in a stimulus. As described above, prior art systems determining matching subjects using a brute-force method that examines each subject against a provided stimulus with a complexity of 0 (Subject Count * Feature Count).

In contrast, utilizing embodiments of the invention, on a 64-bit CPU machine, complexity is reduced:

Pessimistic complexity with sorting=
O(Min (Max(1, Subjects to evaluate/64), Min (Feature (Bit Count))*Feature Count)

Pessimistic complexity without sorting=
O(Max(1, Subjects to evaluate/64)*Feature Count)

Optimistic complexity with or without sorting =
O(Max(1, Subjects to evaluate/64))

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for determining matching subjects for features provided in a stimulus comprising:
   (a) pre-processing subject information comprising:
      (1) receiving input, wherein the input comprises:
         (i) a feature type definition comprising one or more feature types, and a criterion and an assembly process to be used for each of the one or more feature types;
         (ii) a subject set comprising one or more subjects, and one or more features for each subject, wherein each of the one or more features comprises a combination of one of the feature types and one or more feature values;
      (2) for each combination of the feature type and the feature value, building a feature type-feature value BitSet across all of the one or more subjects, wherein each of the one or more subjects is represented by a bit in each feature type-feature value BitSet;
   (b) receiving the stimulus, wherein the stimulus comprises one or more stimulus features, wherein each stimulus feature comprises a stimulus feature type-stimulus feature value combination;
   (c) for each feature type in the one or more stimulus features, assembling all feature type-feature value BitSets from the subject set that match, resulting in assembled feature type BitSets;
   (d) building an evaluation BitSet by combining the assembled feature type BitSets; and
   (e) determining matching subjects that match the stimulus based on the evaluation BitSet.

2. The computer-implemented method of claim 1, wherein the building the feature type-feature value BitSet comprises:
   building a feature type-feature value inclusion BitSet, wherein for each feature type in the combination that has the criterion of an inclusion or a range, start with a first BitSet value for every subject, and set the bit at a position that corresponds to the subject that provides the feature value in the combination to a second BitSet value that is an inverse of the first BitSet value.

3. The computer-implemented method of claim 2, further comprising for each feature type, building a complementary BitSet, wherein each complementary BitSet has a bit that corresponds to one of the subjects.

4. The computer-implemented method of claim 3, wherein building the complementary BitSet comprises:

performing a logical OR operation of all of the feature type-feature value inclusion BitSets that have the same feature type; and
obtaining the complementary BitSet by performing a logical NOT operation on a result of the logical OR operation.

5. The computer-implemented method of claim 4, wherein the building the feature type-feature value BitSet comprises:
   building a feature type-feature value exclusion BitSet, wherein for each feature type in the combination that has the criterion of an exclusion, start with the second BitSet value for every subject, and set the bit at a position that corresponds to the subject that provides the feature value in the combination to the first BitSet value.

6. The computer-implemented method of claim 5, wherein building the feature type-feature value BitSet comprises:
   performing a logical XOR operation between the feature type-feature value inclusion BitSet and the complementary BitSet; and
   performing a logical AND operation between a result of the logical XOR operation and the feature type-feature value exclusion BitSet.

7. The computer-implemented method of claim 6, wherein the assembling all feature type-feature value BitSets from the subject set that match comprises:
   (a) when the criterion for the feature type is not a range, and the assembly process is mutually exclusive, using the feature type-feature value BitSet as the assembled feature type BitSet;
   (b) when the criterion for the feature type is not a range, and the assembly process is alternative, building and using a BitSet union that combines the feature type-feature value BitSets for feature values having a common feature type as the assembled feature type BitSet; and
   (c) when the criterion is a range:
      (1) building the BitSet union that combines the feature type-feature value BitSets for feature values within the range and having a common feature type;
         (i) when the range is greater than or equal to (>=), using a BitSet union of all BitSets with feature type-feature values lower than the stimulus feature type-stimulus feature value combination;
         (ii) when the range is less than or equal to (<=), using a BitSet union of all BitSets with feature type-feature values at or higher than the stimulus feature type-stimulus feature value combination;
      (2) performing a logical OR operation between a result from the above steps and the complementary BitSet, resulting in the assembled feature type BitSet.

8. The computer-implemented method of claim 7, further comprising:
   for each feature type that is not in the one or more stimulus features, utilizing the complementary BitSet as the assembled feature type BitSet.

9. The computer-implemented method of claim 8, further comprising:
   building the evaluation BitSet by performing a logical AND operation to the assembled feature type BitSets.

10. The computer-implemented method of claim 9, wherein from the evaluation BitSet, all positions where a bit is set to the second BitSet value correspond to the subjects that match the stimulus.

11. The computer-implemented method of claim 9, further comprising:
sorting the assembled feature type BitSets by bit count in ascending order;
performing the logical AND operation to successive groups of bits within the assembled feature type BitSets in the ascending order, wherein when a resultant value of the groups of bits in the evaluation BitSet resulting from the logical AND operation is the first BitSet value:
skipping performing the logical AND operation on remaining groups of bits, in the sorted assembled feature type BitSets, at a same position as the group of bits.

12. A system for determining matching subjects for features provided in a stimulus comprising:
(a) a server computer having a processor;
(b) an application executing on the server computer that:
(1) pre-processes subject information by:
(A) receiving input, wherein the input comprises:
(i) a feature type definition comprising one or more feature types, and a criterion and an assembly process to be used for each of the one or more feature types;
(ii) a subject set comprising one or more subjects, and one or more features for each subject, wherein each of the one or more features comprises a combination of one of the feature types and one or more feature values;
(B) for each combination of the feature type and the feature value, building a feature type-feature value BitSet across all of the one or more subjects, wherein each of the one or more subjects is represented by a bit in each feature type-feature value BitSet;
(2) receives the stimulus, wherein the stimulus comprises one or more stimulus features, wherein each stimulus feature comprises a stimulus feature type-stimulus feature value combination;
(3) for each feature type in the one or more stimulus features, assembles all feature type-feature value BitSets from the subject set that match, resulting in assembled feature type BitSets;
(4) builds an evaluation BitSet by combining the assembled feature type BitSets; and
(5) determines matching subjects that match the stimulus based on the evaluation BitSet.

13. The system of claim 12, wherein the application builds the feature type-feature value BitSet by:
building a feature type-feature value inclusion BitSet, wherein for each feature type in the combination that has the criterion of an inclusion or a range, start with a first BitSet value for every subject, and set the bit at a position that corresponds to the subject that provides the feature value in the combination to a second BitSet value that is an inverse of the first BitSet value.

14. The system of claim 13, wherein for each feature type, the application builds a complementary BitSet, wherein each complementary BitSet has a bit that corresponds to one of the subjects.

15. The system of claim 14, wherein the application builds the complementary BitSet by:
performing a logical OR operation of all of the feature type-feature value inclusion BitSets that have the same feature type; and
obtaining the complementary BitSet by performing a logical NOT operation on a result of the logical OR operation.

16. The system of claim 15, wherein the application builds the feature type-feature value BitSet by:
building a feature type-feature value exclusion BitSet, wherein for each feature type in the combination that has the criterion of an exclusion, start with the second BitSet value for every subject, and set the bit at a position that corresponds to the subject that provides the feature value in the combination to the first BitSet value.

17. The system of claim 16, wherein the application builds the feature type-feature value BitSet by:
performing a logical XOR operation between the feature type-feature value inclusion BitSet and the complementary BitSet; and
performing a logical AND operation between a result of the logical XOR operation and the feature type-feature value exclusion BitSet.

18. The system of claim 17, wherein the application assembles all feature type-feature value BitSets from the subject set that match by:
(a) when the criterion for the feature type is not a range, and the assembly process is mutually exclusive, using the feature type-feature value BitSet as the assembled feature type BitSet;
(b) when the criterion for the feature type is not a range, and the assembly process is alternative, building and using a bitset union that combines the feature type-feature value BitSets for feature values having a common feature type as the assembled feature type BitSet; and
(c) when the criterion is a range:
(1) building the BitSet union that combines the feature type-feature value BitSets for feature values within the range and having a common feature type;
when the range is greater than or equal to (>=), using a BitSet union of all BitSets with feature type-feature values lower than the stimulus feature type-stimulus feature value combination;
(ii) when the range is less than or equal to (<=), using a BitSet union of all BitSets with feature type-feature values at or higher than the stimulus feature type-stimulus feature value combination; and
(2) performing a logical OR operation between a result from the above steps and the complementary BitSet, resulting in the assembled feature type BitSet.

19. The system of claim 18, wherein for each feature type that is not in the one or more stimulus features, the application utilizes the complementary BitSet as the assembled feature type BitSet.

20. The system of claim 19, wherein the application builds the evaluation BitSet by performing a logical AND operation to the assembled feature type BitSets.

21. The system of claim 20, wherein from the evaluation BitSet, all positions where a bit is set to the second BitSet value correspond to the subjects that match the stimulus.

22. The system of claim 20, wherein the application further:
sorts the assembled feature type BitSets by bit count in ascending order;
performs the logical AND operation to successive groups of bits within the assembled feature type BitSets in the ascending order, wherein when a resultant value of the groups of bits in the evaluation BitSet resulting from the logical AND operation is the first BitSet value:
skips performing the logical AND operation on remaining groups of bits, in the sorted assembled feature type BitSets, at a same position as the group of bits.

* * * * *